United States Patent [19]

Pastureau et al.

[11] Patent Number: 5,173,332
[45] Date of Patent: Dec. 22, 1992

[54] METHOD OF FORMING A MANDREL

[75] Inventors: Nicole Pastureau, Eysines; Patrice Dourthe, Rion des Landes, both of France

[73] Assignee: Aerospatiale Societe Nationale Industrielle, Paris, France

[21] Appl. No.: 695,346

[22] Filed: May 3, 1991

[30] Foreign Application Priority Data

Jun. 13, 1990 [FR] France ................. 90 07319

[51] Int. Cl.⁵ .................. B05D 3/02; B05D 3/12
[52] U.S. Cl. ................... 427/133; 264/29.5; 427/228; 427/356; 427/358; 427/385.5; 427/443.2
[58] Field of Search ........... 264/29.5; 156/89; 427/133, 228, 385.5, 393.6, 413, 443.2, 356, 358

[56] References Cited

U.S. PATENT DOCUMENTS

| 3,557,294 | 1/1971 | Dear et al. | 424/342 |
| 4,567,007 | 1/1986 | Harder | 264/29.5 |
| 4,847,063 | 7/1989 | Smith | 423/445 |

FOREIGN PATENT DOCUMENTS

| 0237031 | 9/1987 | European Pat. Off. |
| 0284497 | 9/1988 | European Pat. Off. |
| 2587375 | 3/1987 | France |
| 2624111 | 6/1989 | France |

*Primary Examiner*—James Lowe
*Assistant Examiner*—Christopher A. Fiorilla
*Attorney, Agent, or Firm*—Fisher, Christen & Sabol

[57] ABSTRACT

A mandrel for manufacturing a hollow composite material body. The mandrel is formed by an homogeneous graphite felt block whose fibers are embedded in a pyrolysis carbon matrix. The densification of the arrangement of fibers forming the hollow body is carried out in a neutral atmosphere.

18 Claims, No Drawings

METHOD OF FORMING A MANDREL

BACKGROUND OF THE INVENTION

1. Field of the Invention

The present invention relates to the manufacture of hollow composite material bodies.

Although not exclusively, it is particularly appropriate to the manufacture of hollow three dimensional composite material bodies using a method in which, in a support mandrel whose outer surface corresponds to the inner surface of said hollow body, rigid members are lodged at least substantially orthogonal to said outer surface, then on the outer surface of said mandrel successive layers of superimposed and crossed fibers (glass, carbon, boron, etc.) are applied and the arrangement of said fibers is hardened with a hardenable binder, which forms a matrix and which may be introduced into said arrangement of fibers either by impregnating said fibers prior to application thereof on the mandrel, or preferably by impregnating said arrangement of fibers after formation thereof (for example by depositing said binder in the vapor phase) after which said mandrel is removed from the hollow body thus obtained.

The invention relates more particularly to a method for forming a mandrel for implementing the above described method of manufacturing hollow bodies, as well as a mandrel intended for manufacturing composite hollow bodies.

2. Description of the Prior Art

Such a method of manufacturing hollow bodies is for example described in the U.S. Pat. No. 3,577,294.

In this patent, said rigid members are themselves formed of fibers intended to remain imprisoned in said arrangement of layers so as to form one of the three dimensions of the hollow bodies. In order to be able to house such rigid members, the mandrel used is made on the surface from a material, such as a foam, into which said rigid members may readily penetrate first of all then be retained. Furthermore, in order to obtain hollow bodies with as precise a shape as possible, said hardenable binder is hardened when said arrangement of fibers is supported by said mandrel, thus ensuring stability of said arrangement during hardening. Thus, the mandrel is only removed after hardening of the fibers. For removing the mandrel from the hardened hollow body, the U.S. Pat. No. 3,577,294 provides for the mandrel used to be partially thermally destructible.

The fact that the arrangement of fibers must be hardened before removal of the mandrel is an important disadvantage. In fact, such hardening cannot be carried out at a high temperature for, if not, the foam material holding said rigid members and/or the thermally destructible part of said mandrel in position would be destroyed during hardening of said arrangement of fibers, so that the mandrel could no longer hold this arrangement in position. Now, the hardening operations may require the use of high temperatures (for example higher than 150° C.) for polymerizing certain resins which may be used as hardenable binder. It is further known, as mentioned hereafter, that, in order to obtain high mechanical properties for the hollow body obtained in this way, it is often necessary to use densification operations requiring treatments at even higher temperatures.

In the French patent FR-A-2 587 375 a mandrel is described continuously withstanding a temperature of about 1650° C. and which may temporarily withstand a temperature close to 2000° C. This mandrel is for this purpose formed on the surface by a felt formed of silica fibers and a mineral binder formed for example of a mixture of silicates. The mandrel is obtained by bonding said silica felt on an internal support, for example made from cement or metal, and by curing said felt at 80° C. for at least 48 hours in order to make it rigid through hardening of the mineral binder. The form of the mandrel is obtained, either by pressurized forming or molding of said felt (conceivably before curing), or by machining said felt after curing.

It will be noticed first of all that the structure of such a mandrel is heterogeneous (surface felt covering bonded to a support made from another material), so that the lack of homogeneity of said mandrel raises difficulties when it is subjected to high temperatures.

Furthermore, the temperature resistance performances put forward for such a silica felt mandrel appear justified, since silica melts at about 1600° C. However, in this prior patent, it is stated, without any other particular information being given, that it is possible to form said mandrel from a felt made from a mineral material other than silica, such for example as carbon.

However, since carbon is consumed at about 400° C., we must deduce therefrom that the temperature resistance performances of such a mandrel made from a carbon felt are very much less than those of the silica felt mandrel. Moreover, this prior patent does not mention a specific method of making the carbon felt rigid, so that we must deduce therefrom that such hardening is also obtained by means of a mineral agent of the type used for the silica felt mandrel, which further increases the lack of homogeneity of the mandrel.

However, it is interesting to have an homogeneous carbon felt mandrel for forming composite hollow bodies subjected to high temperature densification operations for carbon felt is cheaper than silica felt.

Thus, one of the objects of the present invention is to make it possible to obtain an homogeneous mandrel made from carbon felt.

DESCRIPTION OF THE PREFERRED EMBODIMENTS

In accordance with the invention, the method for forming a mandrel for manufacturing a hollow composite material body using a manufacturing method in which an arrangement of fibers is applied on said mandrel, then said arrangement of fibers is hardened and is densified by operations requiring the application of high temperatures, after which the hollow body formed by said arrangement of fibers is removed from said mandrel, hardened and densified, said mandrel being formed by means of a graphite felt which is rigidified and which is machined so that its outer surface corresponds to the inner surface of said hollow body, is remarkable in that a graphite felt block is rigidified by impregnating with a polymerizable product capable of generating carbon, then said block of graphite felt is subjected to a high temperature in a neutral atmosphere so as to pyrolyse said polymerizable product, after which said rigidified block is machined to the desired shape for the mandrel.

Thus, the use of a graphite felt block makes unnecessary an internal support of a nature different from said felt. In addition, the pyrolysis of said polymerizable product generates the formation of a carbon matrix coating the graphite fibers of said felt. Thus, a carbon/carbon material mandrel is obtained. It will be noted that, because of operating in a neutral atmosphere, the graphite felt block withstands without damage the high pyrolysis temperature (for example about 850° C.). Using the invention, a mandrel is therefore obtained formed by a carbon/carbon material (so homogeneous in so far as its constituent material is concerned), which:

allows said rigid members to be implanted on the surface and held in position during application of the crossed and superimposed layers;

withstands high temperatures, about 400° C. in an oxidizing atmosphere; and has sufficient mechanical strength for withstanding without deformation the forces applied by said superimposed layers (mainly those which correspond to circumferential windings) during application thereof.

Preferably, the specific mass of the rigidified felt is at least equal to 0.2 g/cm$^3$.

Such a mandrel may be solid or hollow. It may have a form of revolution for applying crossed superimposed layers by filament winding.

It is known commercially that felt is generally in the form of plates (possibly circular) and not in the form of blocks. Therefore, in one embodiment of the method of the invention, felt plates are used which are assembled together to obtain said block. In order that said plates have satisfactory mechanical strength during assembly thereof, it is advantageous to impregnate said plates with the polymerizable product before their assembly, the pyrolysis of said product taking place after assembly of said plates. Thus, during their assembly, said plates are at least partially rigidified by said polymerized carbon-generating product.

Preferably, the assembly of said plates is obtained by bonding using a product also generating carbon. This bonding product may be of the same kind as the product for impregnating the felt, for example a phenolic resin. The bonding product is advantageously charged with carbon powder. Thus, the mandrel obtained is formed only of carbon.

In the case where the method of applying the arrangement of fibers uses not only rigid fixed members, such as barbs, (as is the case in the U.S. Pat. No. 3,577,294) but also a mobile rigid member such as a needle, for introducing through the layers of fibers resting on the mandrel a continuous thread forming successive open loops (as is described in the European patent EP-A-0 284 497), it may be advantageous to improve the friction coefficient of said needle, driven with a reciprocal movement, with respect to the mandrel into which it penetrates.

Therefore, in one embodiment of the mandrel, more particularly but not exclusively intended for implementing the method described in said European patent, said mandrel is impregnated, at least in its surface layer, with a rubbery binder. Advantageously, the thickness of the surface layer of the mandrel impregnated by said rubbery binder is at least equal to the depth of penetration of said needle into said mandrel.

In this case, the rigidified felt block is only machined approximately so as to obtain a mandrel blank, then this blank is subjected at least on the surface to impregnation with a hardenable rubbery binder, after which the blank is machined to the final form of the mandrel.

Such impregnation may be achieved by rotating the blank in a reservoir containing a solution of the rubbery binder, the excess binder being removed for example by spinning before hardening of said binder.

Such a binder may be neoprene latex.

It will be noted that the rubbery binder does not form a simple surface covering of the mandrel adding extra thickness thereto, but on the contrary is impregnated in depth in the surface material of the mandrel.

It can then be seen that the invention relates in addition to a mandrel for manufacturing a hollow composite material body, using a manufacturing method in which an arrangement of fibers is applied on said mandrel, then said arrangement of fibers is hardened and is densified by operations requiring the application of high temperatures, after which the hollow body formed by said arrangement of fibers is removed from said mandrel, hardened and densified, said mandrel comprising graphite felt rigidified and machined so that its outer surface corresponds to the inner surface of said hollow body, this mandrel being remarkable in that it is formed of an homogeneous block of graphite felt whose fibers are embedded in a pyrolysis carbon matrix.

The mandrel in accordance with the invention may in addition be remarkable in that at least its surface layer is impregnated with a rubbery binder.

Another object of the present invention is to overcome the above described drawbacks of the prior technique which appear during densification of the arrangement of fibers and allows the mandrel to be positioned in the arrangement of fibers during hardening and densification thereof, even though these densification operations require the use of high temperatures, for example 2600° C. or more.

Therefore, according to another aspect of the present invention, the method for manufacturing a hollow composite material body, in which:

a mandrel is formed first of all using a graphite felt, which is rigidified and which is machined so that its outer surface corresponds to the inner surface of said hollow body; then an arrangement of fibers is applied on said mandrel which is hardened and densified by operations requiring high temperatures;

after which, the hollow body formed by said arrangement of fibers is removed from said mandrel, hardened and densified;

is remarkable in that :

in order to obtain said mandrel a block of graphite felt is rigidified by impregnating with a carbon-generating polymerizable product, then said block of graphite felt is subjected to a high temperature in a neutral atmosphere in order to pyrolyse said polymerizable product, after which said rigidified block is machined to the desired form for the mandrel; and in that densification of said arrangement of fibers is carried out in a neutral atmosphere.

Since densification is carried out in a neutral atmosphere, it may take place at high temperatures without said mandrel losing its dimensional stability qualities.

In an advantageous embodiment of the method of the invention, said arrangement of fibers is formed of carbon fibers having high breakage strength when they are applied on the mandrel and at least one graphitization treatment at at least 2600° C. in a neutral atmosphere is applied to said fibers supported by said mandrel, after said arrangement of fibers has been formed thereon.

Thus, formation of said arrangement of fibers on the mandrel is facilitated since then said fibers are flexible and said fibers are only rigidified (by the graphitization operation) after formation of said arrangement of fibers.

After such graphitization, said arrangement of fibers is densified by chemical carbon deposition in the vapor phase. Thus, this carbon deposit forms a matrix for said arrangement of fibers.

In order to obtain optimum densification, it is advantageous to provide, after a first operation for chemical deposition of carbon in the vapor phase, an operation for raising the temperature to at least 2400° C. in a neutral atmosphere, then a second operation for chemical deposition of carbon in the vapor phase. In fact, this temperature raising operation opens the pores of the arrangement of fibers, so that the carbon deposited by the second vapor phase chemical deposition operation may penetrate deeply inside said arrangement of fibers while increasing the density thereof.

If required, so as to obtain the desired density, several additional operations of raising the temperature to at least 2400° C. are alternated with several vapor phase carbon chemical deposition operations.

Examples I and II hereafter will better show how a mandrel in accordance with the invention can be produced.

EXAMPLE I

To form a mandrel in accordance with the present invention, having a form of revolution, graphite felt disks are used available commercially under the registered trademark SIGRATHERM and manufactured by the German firm SIGRI ELEKTROGRAPHIT GmbH. These disks have the commercial reference PR-201-16 and have a specific mass of 0.16 g/cm$^3$. Their thickness is 40 mm and their carbon content is at least equal to 99%. The procedure for forming the mandrel is then the following:

a) these graphite felt disks are impregnated with a polymerizable phenolic resin, for example known under the commercial reference RA 101 manufactured by the French firm RHONE POULENC, then said resin is polymerized. Thus, rigidified graphite felt disks are obtained able to be machined, for example by turning;

b) after rigidification of the individual felt disks obtained at a) these disks are stacked and bonded so as to form a cylinder. Preferably, so that the bonding withstands the temperature well, a carbon powder charged resin is used. This resin may be the same as that used in operation a). The proportion of carbon powder may be 3% by weight;

c) the graphite felt cylinder obtained following operation b) is subjected to pyrolysis at 850° C. in a neutral atmosphere.

Through such pyrolysis, the phenolic resin is transformed into carbon, rigidifying the graphite felt. After pyrolysis, the specific mass of the graphite felt cylinder is equal to 0.22 g/cm$^3$. It withstands a temperature of 400° C. in an oxidizing atmosphere. Its mechanical properties are the following:

elastic limit strain parallel to the disks=0.3 MPa;
elastic limit strain perpendicular to the disks=0.1 MPa;
modulus of elasticity parallel to the disks=160 MPa;
modulus of elasticity perpendicular to the disks=7 MPa.

d) the rigidified graphite felt cylinder obtained following operation c) is machined to the final desired shape of the mandrel.

EXAMPLE II

Operations a), b), and c) of example I are repeated and, in the machining operation d), instead of machining the mandrel to its final shape, an approximative blank of the mandrel is formed. Then, the following operations are carried out:

e) the rigidified graphite felt mandrel blank is impregnated at least on the surface with a rubbery binder. This rubbery binder is for example a neoprene latex, such as that known under the commercial reference 115 and manufactured by the American firm E.I. DU PONT DE NEMOURS and CO. Impregnation may be achieved by rotating the mandrel blank in a sealed reservoir containing the neoprene latex diluted with water (75% latex—25% water). The excess neoprene latex is removed by depression spinning;

f) the neoprene latex impregnated mandrel blank is dried.

g) after drying in operation f), the neoprene latex is vulcanized; and h) the mandrel blank impregnated at least on the surface with vulcanized neoprene latex is machined to the final shape desired for the mandrel.

Thus, with the invention, mandrels are obtained capable of holding the layers of superimposed and crossed resistant fibers in position during hardening thereof. In the case where the mandrel according to the invention comprises surface rubber impregnation, it may happen that such impregnation is destroyed during the operations for hardening the hollow body. However, it will be noted that such destruction has no impact on holding the hollow body in position by the mandrel before complete hardening of said layers giving rise to the three dimensional material hollow body.

Example III hereafter illustrates the manufacture of a hollow body in accordance with the present invention.

EXAMPLE III

On the mandrel obtained using the method described in example II, an arrangement of high breakage strength carbon fibers (i.e. having great flexibility) is disposed using the method described in the above mentioned European patent EP-A-0 284 497. Laying of this arrangement of carbon fibers on the mandrel is facilitated by the great flexibility of said fibers.

After forming said arrangement of carbon fibers, it is subjected (carried by said mandrel):

i) to a graphitization treatment in a neutral atmosphere, for transforming said high breakage strength carbon fibers into high modulus of elasticity fibers, i.e. with great rigidity. This graphitization treatment may for example comprise the following operations:

i1 temperature rise up to 2600° C. in 25 hours;
i2 holding the temperature at 2600° C. for 1 hour;
i3 lowering the temperature from 2600° C. to ambient temperature without time requirement;

j) then to chemical deposition of carbon in the vapor phase for increasing the density of the graphite fiber arrangement. For example, this vapor phase deposition operation is carried out at 1000° B for 50 hours;

k) then, a new temperature rise in a neutral atmosphere to 2600° C. is carried out so as to complete graphitization of the carbon fibers and open the pores of the arrangement of fibers during densification;

l) finally, a new chemical deposition of carbon in the vapor phase at 1000° C. is carried out for about 50 hours.

What is claimed is:

1. A method for forming a mandrel used for manufacturing a hollow composite material body using a manufacturing method in which an arrangement of fibers is applied on said mandrel, then said arrangement of fibers is hardened and densified by operations requiring the application of high temperatures, after which the hollow body formed by said arrangement of fibers is removed from said mandrel, hardened and densified, said mandrel being formed by means of a graphite felt which is rigidified and which is machined so that its outer surface corresponds to the inner surface of said hollow body, wherein a graphite felt block is rigidified by impregnating with a polymerizable product capable of generating carbon, then said block of graphite felt is subjected to a high temperature in a neutral atmosphere so as to pyrolyse said polymerizable product, at least the surface layer of said mandrel is impregnated with a rubbery binder, after which said rigidified block is machined to the desired shape for the mandrel.

2. The method as claimed in claim 1 wherein the rigidified felt block is only machined approximately so as to obtain a mandrel blank, then the surface layer of the mandrel is impregnated with the hardenable rubbery binder, after which the mandrel blank is machined tot he final form of the mandrel.

3. The method as claimed in claim 2 wherein the impregnation with the rubbery binder is achieved by rotating the mandrel blank in a reservoir containing a solution of rubbery binder, the excess rubbery binder being removed before the hardening of the rubbery binder.

4. The method as claimed in claim 1 wherein said rubbery binder is a neoprene latex.

5. The method as claimed in claim 1 for forming a mandrel used for implementing a method of arranging fibers in which a continuous thread is introduced through the layers of fibers resting on the mandrel, to form successive open loops, by means of a mobile rigid member such as a needle, wherein the thickness of the surface layer of the mandrel impregnated with the rubbery binder is at least equal to the depth of penetration of said needle.

6. The method as claimed in claim 5 wherein the specific mass of said rigidified felt is at least equal to 0.2 g/cm$^3$.

7. The method as claimed in claim 5 wherein felt plates are used which are assembled together to obtain said block.

8. The method as claimed in claim 7 wherein said plates are impregnated with the polymerizable product before their assembly, the pyrolysis of said product taking place after assembly of said plates.

9. The method as claimed in claim 7 wherein the assembly of said plates is obtained by bonding using a product generating carbon.

10. The method as claimed in claim 9 wherein said bonding product is of the same kind as the product for impregnating the felt.

11. The method as claimed in claim 10 wherein said bonding product is charged with carbon power.

12. The method as claimed in claim 1 wherein the felt block is machined to the final form of the mandrel after impregnation of said block with said rubbery binder.

13. The method as claimed in claim 1 wherein the specific mass of solid rigidified felt is at least equal to 0.2 g/cm$^3$.

14. The method as claimed in claim 1 wherein felt plates are used which are assembled together to obtain said block.

15. The method as claimed in claim 14 wherein said plates are impregnated with the polymerizable product before their assembly, the pyrolysis of said product taking place after assembly of said plates.

16. The method as claimed in claim 14 wherein the assembly of said plates is obtained by bonding using a product generating carbon.

17. The method as claimed in claim 16 wherein said bonding product is of the same kind as the product for impregnating the felt.

18. The method as claimed in claim 17 wherein said bonding product is charged with carbon powder.

* * * * *